United States Patent
Gomez et al.

(10) Patent No.: US 9,669,347 B2
(45) Date of Patent: Jun. 6, 2017

(54) CARBON SAFE VAPOR RECOVERY SYSTEM

(71) Applicant: Jordan Technologies, Inc., Louisville, KY (US)

(72) Inventors: Alex Gomez, Prospect, KY (US); Alex Daub, Fisherville, KY (US); Daniel Nusbaum, Louisville, KY (US)

(73) Assignee: JORDAN TECHNOLOGIES, LLC, Louisville, KY (US)

( * ) Notice: Subject to any disclaimer, the term of this patent is extended or adjusted under 35 U.S.C. 154(b) by 20 days.

(21) Appl. No.: 14/403,331

(22) PCT Filed: May 29, 2013

(86) PCT No.: PCT/US2013/042974
§ 371 (c)(1),
(2) Date: Nov. 24, 2014

(87) PCT Pub. No.: WO2013/181178
PCT Pub. Date: Dec. 5, 2013

(65) Prior Publication Data
US 2015/0135950 A1    May 21, 2015

Related U.S. Application Data

(60) Provisional application No. 61/652,409, filed on May 29, 2012.

(51) Int. Cl.
*B01D 53/74*     (2006.01)
*B01D 53/04*     (2006.01)
(Continued)

(52) U.S. Cl.
CPC ......... *B01D 53/0446* (2013.01); *B01D 53/04* (2013.01); *B01D 53/1487* (2013.01);
(Continued)

(58) Field of Classification Search
CPC   B01D 53/04; B01D 53/0446; B01D 53/1487; B01D 53/18; B01D 2253/102;
(Continued)

(56) References Cited

U.S. PATENT DOCUMENTS

| 2,632,726 A |   | 3/1953 | Ringham et al. |
| 4,066,423 A | * | 1/1978 | McGill .................. B01D 53/04 95/103 |

(Continued)

FOREIGN PATENT DOCUMENTS

| DE | 41 30 929 A1 | 3/1993 |
| DE | 43 27 524 A1 | 2/1995 |

OTHER PUBLICATIONS

International Search Report and Written Opinion for International application No. PCT/US2013/042974 dated Dec. 2, 2013.
English Machine Translation of DE4327524, published 1995.
English Machine Translation of DE4130929, published 1993.

*Primary Examiner* — Frank Lawrence
(74) *Attorney, Agent, or Firm* — King & Schickli, PLLC

(57) ABSTRACT

An apparatus for recovering volatile liquid vapor from an air-volatile liquid vapor mixture includes a vapor blower unit having a first inlet and a first outlet. In addition the apparatus includes a vapor adsorption unit including a second inlet and a second outlet and a solid adsorbent adsorption unit including a third inlet and a third outlet. Further the apparatus includes a vapor regeneration unit including an intake port and a discharge port as well as a conduit system. The conduit system connects the first outlet to the second inlet, the second outlet to the third inlet, the third outlet to the intake port and the discharge port to the first inlet.

16 Claims, 3 Drawing Sheets

(51) Int. Cl.
*B01D 53/14* (2006.01)
*B01D 53/18* (2006.01)

(52) U.S. Cl.
CPC ........ *B01D 53/18* (2013.01); *B01D 2253/102* (2013.01); *B01D 2253/104* (2013.01); *B01D 2253/106* (2013.01); *B01D 2253/1124* (2013.01); *B01D 2257/708* (2013.01); *B01D 2259/402* (2013.01); *B01D 2259/4516* (2013.01)

(58) Field of Classification Search
CPC ........ B01D 2253/104; B01D 2253/106; B01D 2253/1124; B01D 2257/708; B01D 2259/401; B01D 2259/416
USPC ........ 95/92, 96, 143, 187, 237; 96/121, 243, 96/355
See application file for complete search history.

(56) References Cited

U.S. PATENT DOCUMENTS

| | | | |
|---|---|---|---|
| 4,715,868 A | | 12/1987 | Kennedy |
| 5,426,945 A | * | 6/1995 | Menzenski .......... B01D 5/0039 62/48.2 |
| 5,655,852 A | | 8/1997 | Duffney et al. |
| 5,681,369 A | * | 10/1997 | Osborne ................ B01D 53/04 95/101 |
| 5,862,819 A | | 1/1999 | Cradeur |
| 5,871,568 A | | 2/1999 | Gibson |
| 5,951,741 A | * | 9/1999 | Dahl .................. B01D 53/0446 95/104 |
| 2009/0173231 A1 | * | 7/2009 | Schroeder .......... B01D 53/0407 96/114 |

\* cited by examiner

CARBON SAFE VAPOR RECOVERY SYSTEM

This application is a national stage of international patent application no. PCT/US2013/042974 filed on May 29, 2013, which in turn claims priority from U.S. Provisional Application Ser. No. 61/652,409 filed on May 29, 2012, the disclosures of each of which are incorporated herein by reference in their entirety.

TECHNICAL FIELD

This document relates generally to the field of volatile liquid vapor recovery and, more particularly, to an apparatus and method for ensuring that all untreated vapors are processed by a vapor absorption unit prior to reaching an adsorption unit in order to protect the adsorbent in the beds of the adsorption unit.

BACKGROUND

When handling volatile liquids such as hydrocarbons including gasoline and kerosene, air-volatile liquid vapor mixtures are readily produced. The venting of such air-vapor mixtures directly into the atmosphere results in significant pollution of the environment. Accordingly, existing environmental regulations require the control of such emissions.

As a consequence, a number of processes and apparatus have been developed and utilized to recover liquids from air-volatile liquid vapor mixtures. Generally, the recovered volatile vapors are liquified and recombined with the volatile liquid from which they were vaporized thereby making the recovery process more economical.

The initial vapor recovery systems utilized in the United States in the late 1920's and early 1930's incorporated a process combining compression and condensation. Such systems were originally only utilized on gasoline storage tanks. It wasn't until the 1950's that local air pollution regulations began to be adopted, thus forcing the installation of vapor recovery systems at truck loading terminals. Shortly thereafter, the "clean air" legislation activity of the 1960's, which culminated in the Clean Air Act of 1968, further focused nationwide attention on the gasoline vapor recovery problem. As a result, a lean oil/absorption system was developed. This system dominated the marketplace for a short time.

Subsequently, in the late 1960's and early 1970's cryogenic refrigeration systems began gaining market acceptance (note, for example, U.S. Pat. No. 3,266,262 to Moragne). While reliable, cryogenic systems suffer from a number of shortcomings including high horsepower requirements. Further, such systems require relatively rigorous and expensive maintenance to function properly. Mechanical refrigeration systems also have practical limits with respect to the amount of cold that may be delivered, accordingly, the efficiency and capacity of such systems is limited. In contrast, liquid nitrogen cooling systems provide more cooling than is required and are prohibitively expensive to operate for this type of application.

As a result of these shortcomings, alternative technology was sought and adsorption/absorption vapor recovery systems were more recently developed. Such a system is disclosed in a number of U.S. Patents including, for example, U.S. Pat. No. 5,871,568 to Gibson, the disclosure of which is fully incorporated herein by reference. Such systems utilize beds of solid adsorbent selected, for example, from silica gel, certain forms of porous mineral such as alumina and magnesia, and most preferably activated charcoal. These adsorbents have an affinity for volatile hydrocarbon liquids. Thus, as the air-hydrocarbon vapor mixture is passed through the bed, a major portion of the hydrocarbons contained in the mixture are adsorbed on the bed. The resulting residue gas stream comprising substantially hydrocarbon-free air is well within regulated allowable emission levels and is exhausted into the environment.

The beds of solid adsorbent, such as activated carbon are relatively expensive materials. The present apparatus and method processes all untreated vapors in a vapor absorption unit prior to reaching the solid adsorption unit and its bed of solid adsorbent. As a result, the untreated vapors are exchanged for known absorbent vapors. Thus, foreign and potentially harmful vapors are prevented from reaching the solid adsorbent in the beds. Thus, any threat of foreign vapors to the life cycle of the solid adsorbent is effectively eliminated.

SUMMARY

In accordance with the purposes described herein an improved apparatus is provided for recovering volatile liquid vapor from an air-volatile liquid vapor mixture. The apparatus comprises a vapor blower unit including a first inlet and a first outlet, a vapor adsorption unit including a second inlet and a second outlet, an adsorption unit including a third inlet and a third outlet, a vacuum generation unit including an intake port and a discharge port, and a conduit system. The conduit system connects the first outlet to the first inlet, the second outlet to the third inlet, the third outlet to the intake port and the discharge port to the first inlet.

More specifically describing the apparatus, it includes an air-volatile liquid vapor mixture source connected by the conduit system to the vapor blower unit. The vapor blower unit includes an additional inlet and the air-volatile liquid vapor mixture sources connected by the conduit system to the additional inlet. Further the apparatus includes an adsorbent source.

Additionally, the apparatus includes an adsorbent supply line connecting the absorbent source to an absorbent feed port on the vapor absorption unit. Further the apparatus includes an absorbent return line connecting an absorbent discharge port on the absorption unit to the absorbent source. In one possible embodiment the absorbent source is a volatile liquid storage tank.

The adsorption unit may include a first reaction vessel including a first bed of adsorbent and a second reaction vessel including a second bed of adsorbent. Further, the adsorption unit also includes a plurality of valves allowing (a) the first bed of adsorbent to adsorb volatile liquid vapors while the second bed of adsorbent is being regenerated and (b) the second bed of adsorbent to adsorb volatile liquid vapors while the first bed of adsorbent is being regenerated.

In accordance with additional aspects, a method for recovering volatile liquid vapor from an air-volatile liquid vapor mixture. The method may be broadly described as comprising the steps of: (a) feeding an untreated air-volatile liquid vapor mixture to a vapor absorption unit with a vapor blower unit, (b) condensing and collecting volatile liquid vapor in the vapor absorption unit, (c) feeding an air-absorbent liquid vapor mixture from the absorption unit to an adsorption unit, and (d) adsorbing the absorbent liquid vapor on a first bed of the adsorption unit.

In one embodiment the method further includes processing all untreated volatile liquid vapors through the absorption unit prior to reaching the adsorption unit. In one possible embodiment the method includes exchanging any untreated volatile liquid vapors with known absorbent vapors before reaching the adsorption unit. Further, in one possible embodiment the method includes regenerating a second bed of adsorbent in the adsorption unit with a vacuum regeneration unit and connecting a discharge port of the vacuum regeneration unit with the vapor blower unit for recycling regenerated vapors from the adsorption unit to the absorption unit with the untreated air-volatile liquid vapor mixture. Further, in one possible embodiment the method includes performing the adsorbing and regenerating steps simultaneously.

In yet another possible embodiment a method is provided for protecting a solid adsorbent in an adsorption unit from potentially harmful vapors that could poison the adsorbent, lowering its efficiency and/or lifespan. The method comprises processing the potentially harmful vapors through a vapor absorption unit and subsequently feeding an air-absorbent liquid vapor mixture from the absorption unit to the adsorption unit. In at least one embodiment this method further includes exchanging potentially harmful vapors with known absorbent vapors in the vapor absorption unit before feeding the air-absorbent liquid vapor mixture from the absorption unit to the adsorption unit.

BRIEF DESCRIPTION OF THE DRAWINGS

The accompanying drawings incorporated herein and forming a part of the specification, illustrate several aspects of the apparatus and method and together with the description serve to explain certain principles thereof. In the drawings.

Reference will now be made in detail to the present preferred embodiment of the apparatus illustrated in the accompanying drawings.

DETAILED DESCRIPTION

Figure 1:
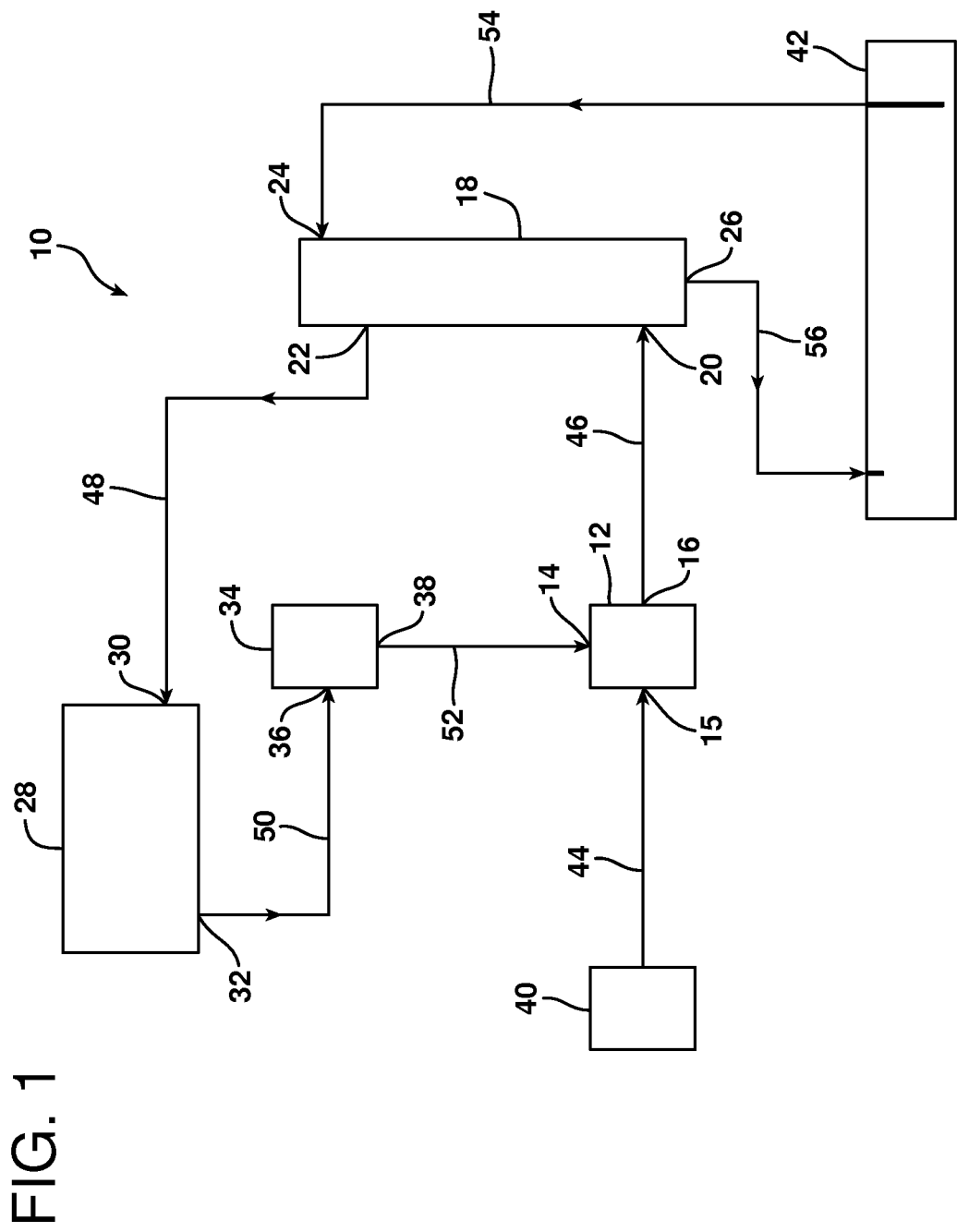
FIG. 1 is a schematical diagram showing the apparatus for recovering volatile liquid vapor from an air-volatile liquid vapor mixture.

Reference is now made to FIG. 1 which schematically illustrates a vapor recovery unit or apparatus, generally designated by reference numeral 10, for recovering volatile liquid vapor from an air-volatile liquid vapor mixture. As illustrated, the apparatus 10 includes a vapor blower unit 12 having a first inlet 14, a second inlet 15 and an outlet 16. The apparatus 10 further includes a vapor absorption unit 18 including a mixed vapor inlet 20, a recycled vapor outlet 22, an adsorbent supply inlet 24 and an adsorbent return outlet 26.

The apparatus 10 further includes an adsorption unit 28 having a recycled vapor inlet 30 and a regenerated vapor outlet 32. Still further the apparatus 10 includes a vapor regeneration unit 34 including an intake port 36 and a discharge port 38. The apparatus 10 functions to collect volatile liquid vapor from an air-volatile liquid vapor mixture source 40 and stores the collected volatile liquid vapor in a storage tank 42. A conduit system connects the various components 12, 18, 28, 34, 40 and 42.

More specifically, the air-volatile liquid vapor mixture source 40 is connected via the conduit line 44 to the untreated air-volatile liquid vapor mixture inlet 15 of the vapor blower unit 12. The commingled vapor outlet 16 of the vapor blower unit 12 is connected via the conduit line 46 to the vapor inlet 20 of the vapor absorption unit 18. The recycled vapor outlet 22 of the vapor absorption unit 18 is connected via the conduit line 48 to the recycled vapor inlet 30 of the adsorption unit 28. The regenerated vapor outlet 32 of the adsorption unit 28 is connected via the conduit line 50 to the intake port 36 of the vacuum regeneration unit 34. The discharge port 38 of the vacuum regeneration unit 34 is connected via the conduit line 52 to the regenerated vapor inlet 14 of the vapor blower unit 12.

As also illustrated, an absorbent supply line 54 carries absorbent from the storage tank 42 to the absorbent inlet 24 of the vapor absorption unit 18. An absorbent return line 56 carries absorbent and condensed volatile vapor from the absorbent return outlet 26 of the vapor absorption unit 18 to the storage tank 42.

Figure 2:
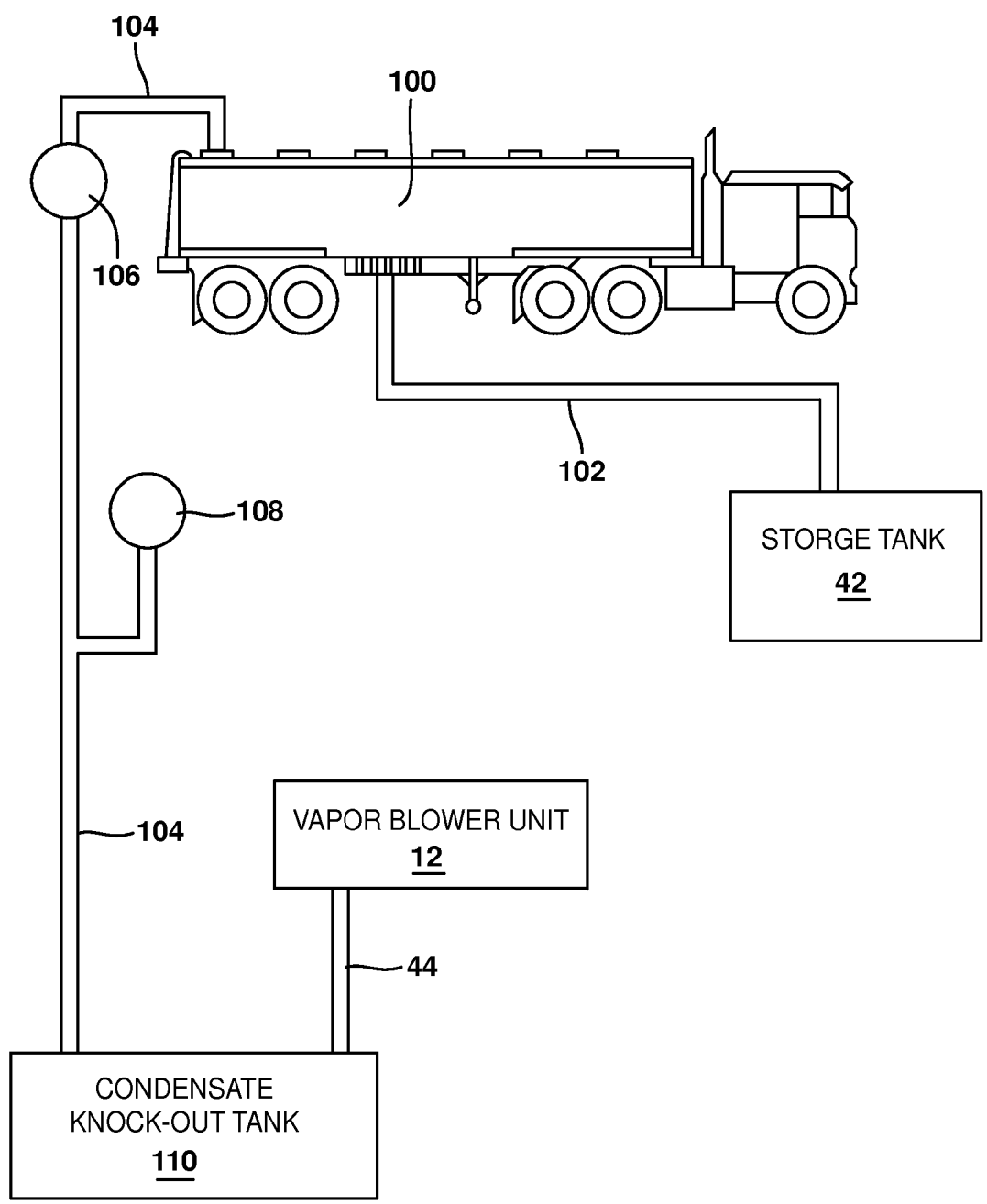
FIG. 2 is a schematical diagram illustrating how the apparatus set forth in FIG. 1 is connected to a tanker truck being loaded with volatile liquid such as hydro carbons from a storage tank to a feed line.

The vapor recovery apparatus 10 is particularly suited to the recovery of vaporized hydrocarbons of the type expelled from trucks, tank cars and other vessels 100 as they are loaded with hydrocarbons from a storage tank 42 through a feed line 102 (see also FIG. 2 where the vessel 100 is the equivalent of the source 40). More particularly, those vapors are collected as an air-hydrocarbon vapor mixture in a collection line 104, attached to the truck 100 and delivered past a vapor check valve 106 and pressure/vacuum vent 108 to a condensate knock-out tank 110. From there the air-hydrocarbon vapor mixture passes along the conduit line 44 to the inlet 15 of the vapor blower unit 12.

As should be appreciated from reviewing FIG. 1, the vapor blower unit 12 also receives regenerated vapors from the vacuum regeneration unit 34 through the conduit line 52 and inlet 14. Thus, the vapor blower unit 12 can deliver either untreated vapors from the truck 100, regenerated vapors from the vacuum regeneration unit 34 or even simultaneously deliver untreated vapors from the truck 100 and regenerated vapors from the vacuum regeneration unit 34 through the outlet 16, conduit line 46 and mixed vapor inlet 20 into the vapor absorption unit 18.

The vapor absorption unit 18 provides a countercurrent flow of absorbent which condenses the volatile liquid vapors from the mixed vapors delivered to the vapor absorption unit 18 by the vapor blower unit 12 through the inlet 20 via conduit line 46. The absorbent for the countercurrent flow is provided from the absorbent tank 42 through the supply line 54 and the adsorbent inlet 24. The condensed volatile liquid vapors and remaining liquid absorbent are then returned to the storage tank 42 through the adsorbent return outlet 26 and conduit line 56. Any remaining vapors exit the vapor absorption unit 18 through the outlet 22 and those remaining vapors are recycled through the conduit line 48 to the inlet 30 of the carbon adsorption unit 28.

Figure 3:
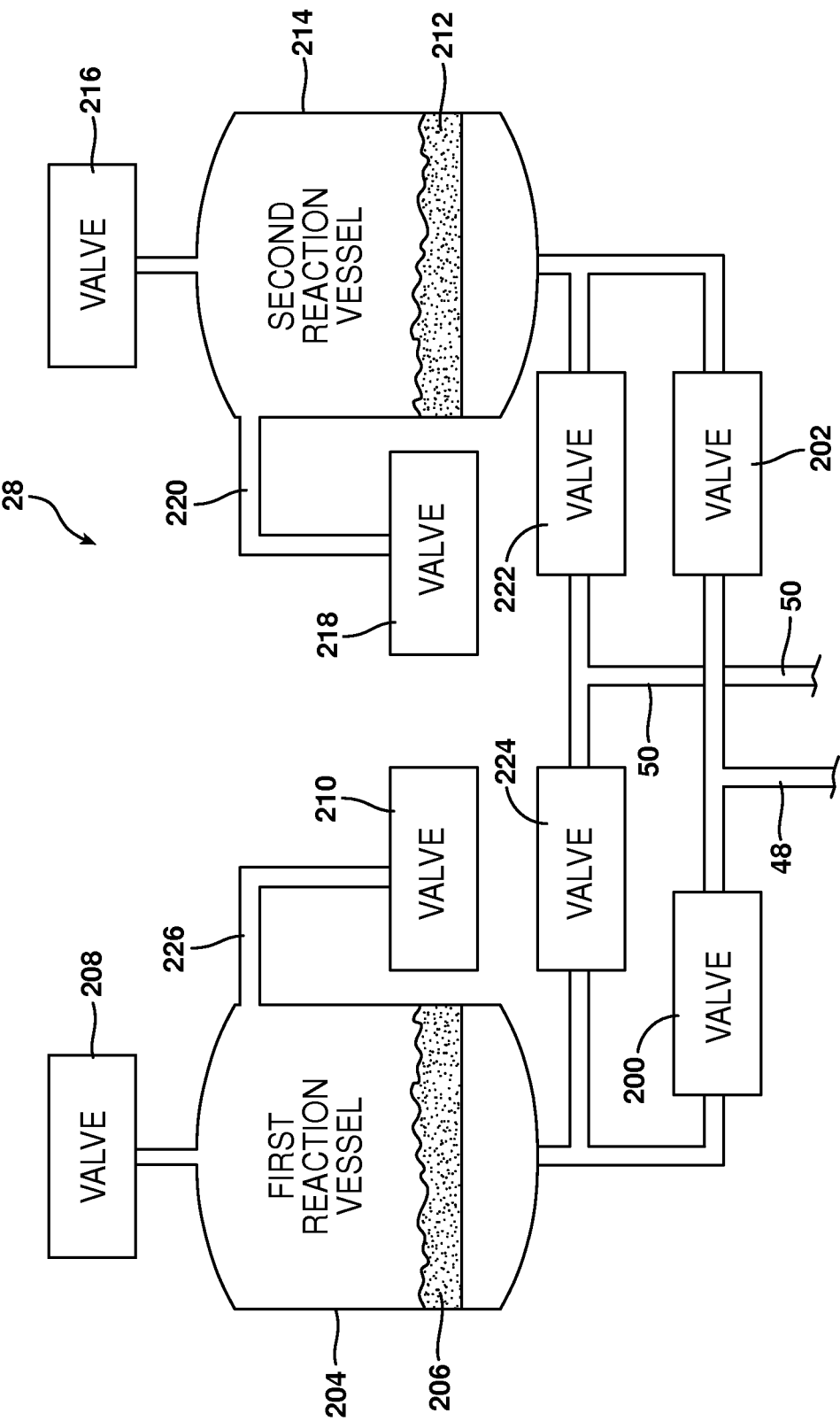
FIG. 3 is a detailed schematical illustration of the adsorption unit of the apparatus.

Reference is now made to FIG. 3 which illustrates the adsorption unit 28 in detail. The adsorption unit 28 includes a first reaction vessel 204 holding a first bed 206 of adsorbent and a second reaction vessel 214 holding a second bed 212 of adsorbent. In the illustrated embodiment each bed 206, 212 comprises a solid adsorbent. Useful solid adsorbents include, but are not limited to, carbon, activated carbon, activated charcoal, silica gel, certain forms of porous minerals such as alumina and magnesia and mixtures thereof. A particularly useful activated charcoal adsorbent is available from Jordan Technologies located in Louisville, Ky. USA.

As illustrated, the recycled vapors in conduit line 48 flow past open valve 200 (valve 202 is closed) to the first reaction vessel 204 including a first bed of adsorbent 206. The bed 206 adsorbs the volatile hydrocarbon vapors that remain in the recycled vapors discharged from the outlet 22 of the vapor adsorption unit 18 and clean air is exhausted past the valve 208 into the environment, valve 210 being closed.

Simultaneously, the adsorbent bed 212 in the second reaction vessel 214 is being regenerated: that is the capacity of the bed 212 to adsorb vapor is being renewed. To achieve this end, valves 216 and 218 are initially closed and the vacuum regeneration unit 34 is operated to pull a vacuum on the bed 212 in the second reaction vessel 214. Generally, as is known in the industry, a liquid ring, two-stage vacuum pump or a dry vacuum pump, having a capacity of, for example, 100-2000 cfm is utilized for this purpose.

As the vacuum regeneration unit 34 draws the vacuum down in the reaction vessel 214 to 22-28 inches of mercury vacuum, a mixture of air and volatile liquid vapor is pulled from the bed 212. This mixture of regenerated vapors is drawn through the open valve 222 through the conduit line 50 and the intake port 36 by the vacuum regeneration unit 34 and exhausted through the discharge port 38 along the conduit line 52 to the inlet 14 of the vapor blower unit 12. There, the regenerated vapors are mixed with untreated vapors still being drawn from the truck 100 and those mixed vapors are then returned by the vapor blower unit 12 through the conduit line 46 and inlet 20 to the vapor absorption unit 18 where the condensation of the vapors and the recovery process is again completed.

Toward the end of the regeneration cycle, (e.g. when a specific vacuum level is reached or for a specific time such as the last 1-2 minutes of an approximately 10-17 minute cycle), a small quantity of purge air is introduced to the reaction vessel 214 by opening valve 218. This purge air is drawn from the ambient atmosphere through the line 220 and is passed through the bed 212 to flush the adsorbent clean of the remaining hydrocarbons. The purge air is drawn through valve 222 by the vacuum regeneration unit 34. During this process it should be appreciated that the purge air is only introduced to the bed 212 at a rate sufficient to substantially maintain a pressure of approximately 22-28 and more preferably 25-27 inches of mercury vacuum. The purge air and the last of the hydrocarbons are also directed by the vacuum regeneration unit 34 through the conduit line 52 to the vapor blower unit 12.

Once the second bed 212 of adsorbent has been regenerated, valve 200 is closed and valve 202 is opened to begin the adsorption of volatile liquid vapors on the newly regenerated bed 212 in the second reaction vessel 214 while the adsorbent bed 206 in the first reaction vessel 204 is undergoing regeneration. Thus, the bed 212 now adsorbs the volatile liquid vapors that remain in the recycled vapors discharged from the outlet 22 of the vapor absorption unit 18 and clean air is exhausted through the valve 216 into the environment, valve 218 being closed.

Simultaneously, the adsorbent bed 206 in the first reaction vessel 204 is being regenerated. Toward this end, valves 208 and 210 are initially closed and the vacuum regenerator unit 34 is operated to pull a vacuum on the bed 206.

As the vacuum regeneration unit 34 draws the vacuum down in the reaction vessel 204 to 22-28 inches of mercury vacuum, a mixture of air and volatile liquid vapor is pulled from the bed 206. This mixture of regenerated vapors is drawn through the open valve 224 through the conduit line 50 and the intake port 36 by the vacuum regeneration unit 34 and exhausted through the discharge port 38 along the conduit line 52 to the inlet 14 of the vapor blower unit 12. There, the regenerated vapors are mixed with untreated vapors if they are still being drawn from truck 100 and those mixed vapors are then returned by the vapor blower unit 12 through the conduit line 46 and inlet 20 to the vapor absorption unit 18 where the condensation of the vapors and the recovery process is again completed.

Toward the end of the regeneration cycle, (e.g. when a specific vacuum level is reached or for a specific time such as the last 1-2 minutes of an approximately 10-17 minute cycle), a small quantity of purge air is introduced to the reaction vessel 204 by opening valve 210. This purge air is drawn from the ambient atmosphere through the line 226 and is passed through the bed 206 to flush the adsorbent clean of the remaining hydrocarbons. The purge air is drawn through valve 224 by the vacuum regeneration unit 34. During this process it should be appreciated the purge air is only introduced to the bed 206 at a rate sufficient to substantially maintain a pressure of approximately 22-28 and more preferably 25-27 inches of mercury vacuum. The purge air and the last of the hydrocarbons are also directed by the vacuum regeneration unit 34 through the conduit line 52 to the vapor blower unit 12.

As should be appreciated, the vapor blower unit 12 has sufficient power and capacity to receive the regenerated vapors from the vacuum regeneration unit 34 and the untreated vapors from the untreated vapor source 40 or truck 100 and efficiently send them to the absorption unit 18. In the absorption unit 18 the mixed vapors are cooled and condensed and then delivered to the storage tank 42 through the conduit line 56. Only a small percentage of the untreated vapors are replaced by absorbent vapors from the counter-current flow absorbent provided through the supply line 54. Those replaced with absorbent vapors are then delivered to the carbon adsorption unit 28 where they are collected and recycled back through the system.

Numerous benefits and advantages result from the operation of the apparatus 10. More specifically, all vapors are processed by the vapor absorption unit 18 prior to reaching the carbon adsorption unit 28. As a result, any vapors that may inhibit the functionality of the adsorbent are initially exchanged with known absorbent vapors. Thus, foreign and potentially harmful vapors are prevented from ever reaching the carbon in the adsorbent beds 206, 212. Any threat of foreign vapors to the life cycle of the carbon in the beds 206 and 212 is effectively eliminated. This also minimizes the potential for dangerous temperature spikes in the adsorbent bed. The vapor blower unit 12 advantageously functions to operate the vapor absorption unit 18 under pressure making the process more efficient on the whole. Further, the vapor blower unit 12 effectively lowers the pressure in the truck loading area so that any volatile liquid vapors produced during the truck loading process are positively drawn into the recovery system 10 and the potential for fugitive emissions into the environment is minimized.

The foregoing description of a preferred embodiment has been presented for purposes of illustration and description. It is not intended to be exhaustive or to limit the invention to the precise form disclosed obvious modifications and variations are possible in light of the above teachings. For example, in the illustrated embodiment, the absorbent is volatile liquid from the storage tank 42. It should be noted that a separate absorbent and tank could be used.

What is claimed:

1. An apparatus for recovering volatile liquid vapor from an air-volatile liquid vapor mixture comprising:
   a vapor blower unit including a first inlet and a first outlet;
   a vapor absorption unit including a second inlet and a second outlet;

an adsorption unit including a third inlet and a third outlet;

a vacuum regeneration unit including an intake port and a discharge port; and a conduit system connecting said first outlet to said second inlet, said second outlet to said third inlet, said third outlet to said intake port and said discharge port to said first inlet.

2. The apparatus of claim 1 including an air-volatile liquid vapor mixture source connected by said conduit system to said vapor blower unit.

3. The apparatus of claim 2, wherein said vapor blower unit includes an additional inlet and said air-volatile liquid vapor mixture source is connected by said conduit system to said additional inlet.

4. The apparatus of claim 1, further including an absorbent source.

5. The apparatus of claim 4, further including an absorbent supply line connecting said absorbent source to an absorbent feed port on said vapor absorption unit.

6. The apparatus of claim 5, further including an absorbent return line connecting an absorbent discharge port on said absorption unit to said absorbent source.

7. The apparatus of claim 6 wherein said absorbent source is a volatile liquid storage tank.

8. The apparatus of claim 1, wherein said adsorption unit includes a first reaction vessel including a first bed of adsorbent and a second reaction vessel including a second bed of adsorbent.

9. The apparatus of claim 8, wherein said adsorption unit also includes a plurality of valves allowing (a) said first bed of adsorbent to adsorb volatile liquid vapors while said second bed of adsorbent is being regenerated and (b) said second bed of adsorbent to adsorb volatile liquid vapors while said first bed of adsorbent is being regenerated.

10. The apparatus of claim 9 wherein said adsorbent is selected from a group of materials consisting of carbon, activated carbon, activated charcoal, silica gel, alumina, magnesia and mixtures thereof.

11. A method for recovering volatile liquid vapor from an air-volatile liquid vapor mixture, comprising:

feeding an air-volatile liquid vapor mixture to a vapor absorption unit with a vapor blower unit;

condensing and collecting volatile liquid vapor in said vapor absorption unit;

feeding an air-absorbent liquid vapor mixture from said absorption unit to an adsorption unit;

adsorbing the absorbent liquid vapor on a first bed of adsorbent in said adsorption unit;

regenerating a second bed of adsorbent in said adsorption unit with a vacuum regeneration unit; and connecting a discharge port of said vacuum regeneration unit with said vapor blower unit for recycling regenerated vapors from said adsorption unit to said absorption unit with said untreated air-volatile liquid vapor mixture.

12. The method of claim 11, further including processing all untreated volatile liquid vapors through said absorption unit prior to reaching said adsorption unit.

13. The method of claim 12 including exchanging any untreated volatile liquid vapors with known absorbent vapors before reaching said adsorption unit.

14. The method of claim 11, wherein said adsorbing and regenerating steps are performed simultaneously.

15. A method for protecting an adsorbent in an adsorption unit from potentially harmful vapors, comprising:

processing the potentially harmful vapors through a vapor absorption unit by feeding said potentially harmful vapors to the vapor absorption unit with a vapor blower unit;

subsequently feeding an air-absorbent liquid vapor mixture from said absorption unit to the adsorption unit;

regenerating the adsorbent in the adsorption unit with a vacuum regeneration unit; and recycling regenerated vapors from said adsorption unit, through the vacuum regeneration unit, to the vapor absorption unit by connecting a discharge port of the vacuum regeneration unit with the vapor blower unit for feeding the regenerated vapors from the adsorption unit and untreated potentially harmful vapors to the absorption unit.

16. The method of claim 15 including exchanging potentially harmful vapors with known absorbent vapors in said vapor absorption unit before feeding said air-absorbent liquid vapor mixture from said absorption unit to said adsorption unit.

\* \* \* \* \*